June 26, 1923.

J. G. JOHNSON

TIRE

Filed May 29, 1922

1,460,247

WITNESSES
W. A. Williams.

INVENTOR
John G. Johnson.
BY
Munn & Co.
ATTORNEYS

Patented June 26, 1923.

1,460,247

UNITED STATES PATENT OFFICE.

JOHN GEORGE JOHNSON, OF GORDON, PENNSYLVANIA.

TIRE.

Application filed May 29, 1922. Serial No. 564,479.

*To all whom it may concern:*

Be it known that I, JOHN G. JOHNSON, a citizen of the United States, and resident of Gordon, in the county of Schuylkill and State of Pennsylvania, have invented certain new and useful Improvements in Tires, of which the following is a specification.

My invention relates to tires for vehicles, particularly resilient tires for motor vehicles and it consists in the combinations, constructions and arrangements herein described and claimed.

An object of my invention is to provide a tire body or shoe having an improved tread construction adapted to prevent lateral skidding and circumferential slipping of the tire without any vacuum spaces being provided on the periphery of the tire.

A further object of my invention is to provide a tire body of the character described which is relatively simple in construction, adapted to be manufactured cheaply and easily and which will be durable in service.

Other objects and advantages will be apparent from the following description, and the novel features of the invention will be particularly outlined in the appended claims.

Figure 1:
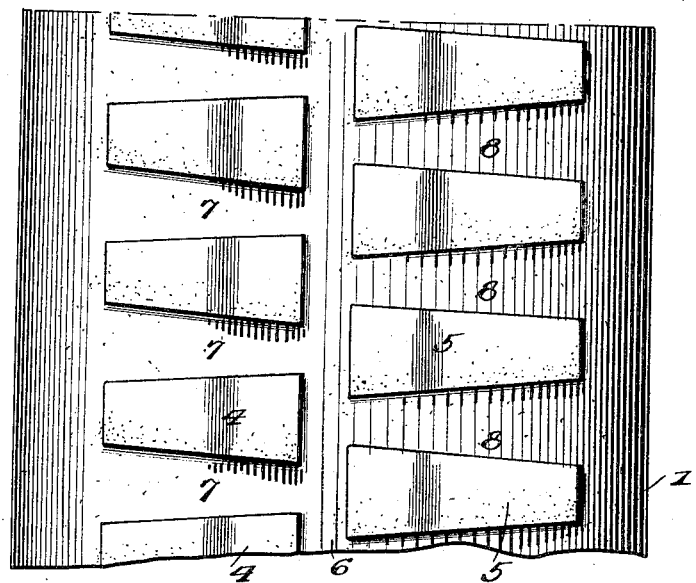
Figure 2:
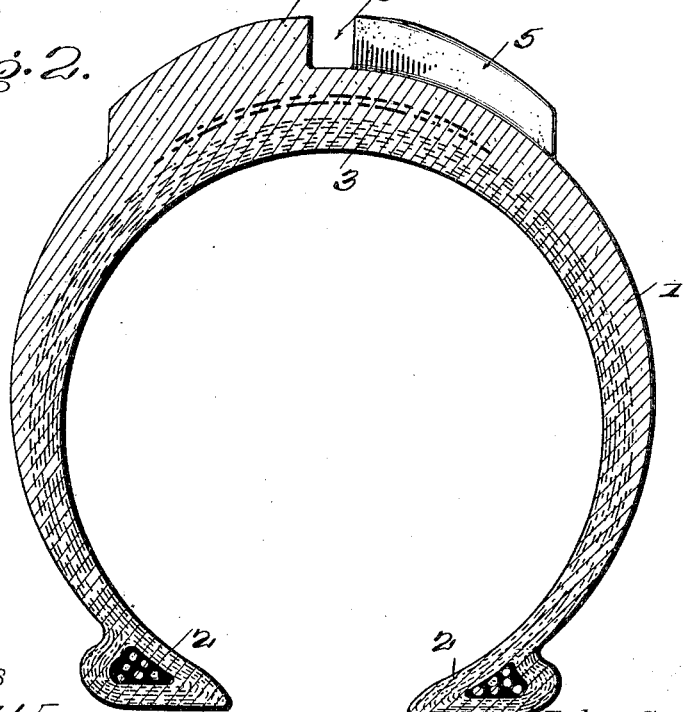

My invention is illustrated in the accompanying drawing, forming a part of this application, in which Figure 1 is a fragmentary plan view of a portion of a tire body embodying the invention, and Figure 2 is a transverse section through the portion of the tire body exhibited in Fig. 1.

My invention is shown for the purpose of illustration in connection with a resilient tire body 1 which is adapted to enclose an inner inflatable tube and which may be of the clincher straight side or other known type of construction. As will hereinafter appear, my invention is capable of embodiment in solid resilient tire bodies as well as in pneumatic tire bodies. The tire body 1 is of conventional construction except as will be hereinafter set forth in detail and includes bead portions 2, 2 adapted for engagement with the rim of a wheel. The tire body 1 also includes a relatively thick outer body or tread portion 3.

In carrying out my invention, I form the tread portion 3 with two circumferentially extending series of transversely disposed bosses 4 and 5 respectively on the outer periphery thereof. The bosses 4 and 5 are integral with the tread portion 3 and are arranged on the periphery of the tread portion with the proximate ends of the bosses of the two series spaced apart and equi-distant from the plane bisecting the tire body longitudinally. The bosses of the series are arranged in staggered relation with respect to each other and the respective bosses of the two series are spaced equi-distantly apart, thereby providing on the outer periphery of the tread portion an annular space 6 extending between the spaced apart proximate ends of the bosses of the two series and communicating at spaced intervals with lateral spaces 7 extending between the spaced apart bosses 4 and communicating at equi-distantly spaced intervals with spaces 8 extending laterally between the spaced apart bosses 5 extending from the annular space or channel 6 in the direction opposite that of the spaces 7, the spaces 7 and 8 being arranged in staggered relation with respect to each other.

Each of the bosses 4 and 5 is thickest adjacent to the end thereof nearest to the middle of the tire body and then decreases in thickness toward the outer end to provide a tread face which is flat adjacent to its inner end and is then convexly curved from the outer end of the flat portion thereof to the outer end of the boss, the tread face of the boss being spaced from the tire body throughout the length of the boss. Each of the bosses 4 and 5 is widest at its inner end and tapers uniformly toward its outer end, as clearly shown in the drawings. All sides of the bosses 4 and 5 are substantially straight, thereby defining sharp outer edges and corner portions of the bosses, which edges and corner portions grip a surface traversed and prevent slipping or skidding of the tire in any direction.

From the foregoing description of the various parts of the device, the operation thereof may be readily understood. As stated, the respective bosses of the two series on the tread portion of a tire body embodying my invention are spaced apart and each provided with straight sides so that the outer edges and corners of the bosses will contact a surface traversed as the tire is rotated to effectually prevent slipping and skidding of the tire. The greatest wear on the bosses will be adjacent to the inner or proximate ends thereof and these portions of the bosses are wider and thicker than the outer end portions thereof, thus promoting durability. An important feature of the invention is the provision of the annular space or channel 6 extending along the middle of the tread portion of the tire and the side or lateral channels 7 and 8 communicating therewith. Any suction which might be produced by a vacuum at the outer periphery of a tire body embodying the invention is obviated. This beneficial result is occasioned by the fact that the portion of the tire body proper closest to a surface being traversed is always spaced slightly from the latter so that air is permitted to pass through the channels or spaces 6, 7 and 8, and in consequence no vacuum spaces are formed between the tire body and the surface being traversed. The strain and wear on the tread portion of a tire embodying the invention is thus reduced to a minimum without sacrificing any of the beneficial results of tires making use of the usual suction cup and suction elements on the outer periphery of the tread portion thereof.

Obviously, my invention is susceptible of embodiment in forms other than that in which illustrated in the accompanying drawings, and I therefore consider as my own all modifications and adaptations thereof which fairly fall within the scope of the appended claims.

Having, thus described the invention, what I claim is :—

1. A tire body having a tread portion formed with a pair of circumferentially extending series of spaced apart transversely disposed bosses upon the outer periphery thereof, the bosses of the two series being arranged with their inner ends spaced apart and equi-distant from the plane of the longitudinal median line of the tire body, thus producing a circumferential channel extending along the longitudinal median line of the tire body between the two series of bosses, and each boss being thickest adjacent to its inner end and widest at its inner end and decreasing regularly in width toward its outer end, the outer surfaces of said bosses being spaced from the tire body throughout the length of the bosses.

2. A tire body having a tread portion formed with a pair of circumferentially extending series of spaced apart transversely disposed bosses upon the outer periphery thereof, the bosses of the two series being arranged with their inner ends spaced apart and equi-distant from the plane of the longitudinal median line of the tire body, the respective bosses of the two series being arranged in staggered relation in respect to each other, the outer face of each boss being convexly curved from the outer end of the boss for the greater part of the length thereof and being flat from the inner end of the convexly curved part to the inner end of the boss.

3. A tire body having a tread portion formed with two circumferentially extending series of spaced apart transversely disposed bosses on the outer periphery thereof, the outer surface of each boss being flat for a relatively short distance from the inner end thereof and the boss then decreasing in thickness toward the outer end thereof.

JOHN GEORGE JOHNSON.